March 18, 1969      F. GEORGE BOGGIO      3,433,382
PRE-STRESSED SEGMENTED CONTAINERS OR PRESSURE VESSELS
Filed May 22, 1967
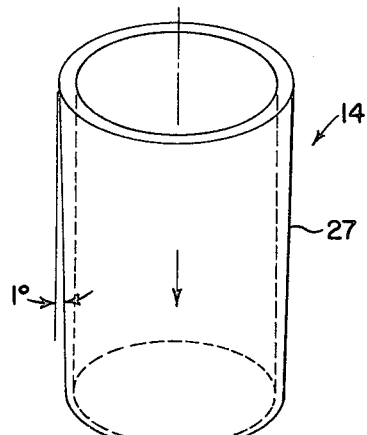
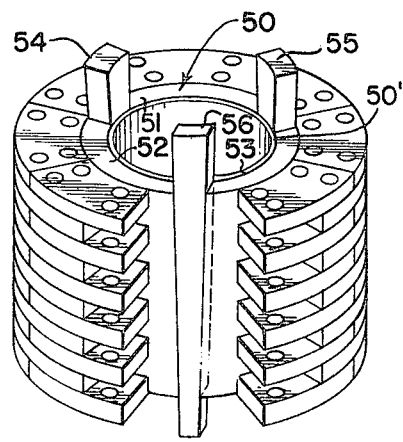
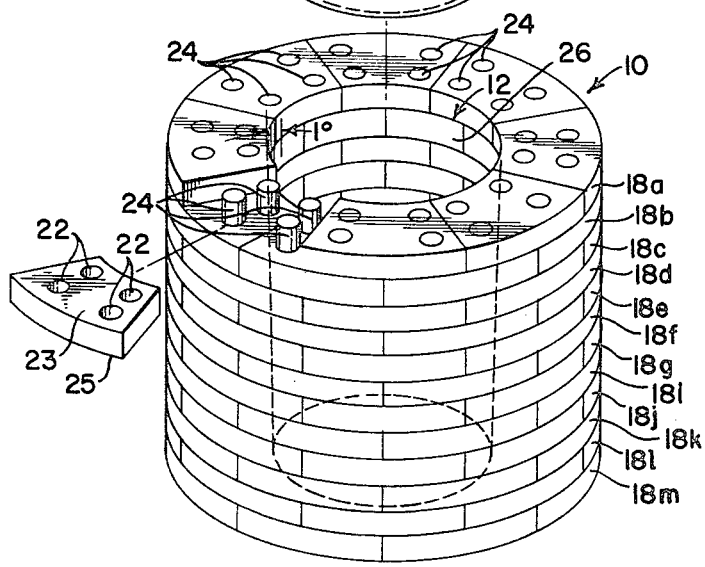
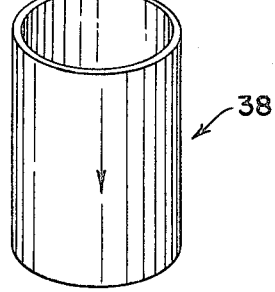
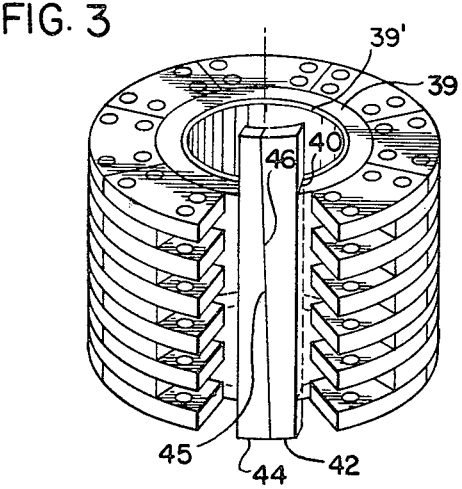
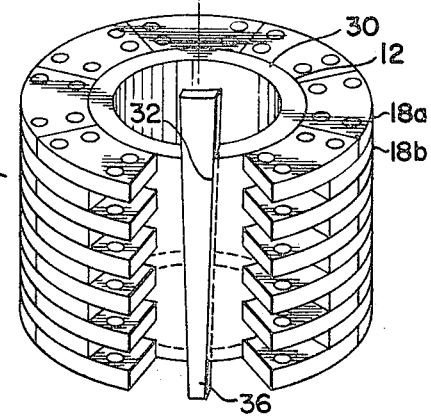
INVENTOR.
F. GEORGE BOGGIO
BY
Meyer, Tilberry & Body
ATTORNEYS ns patented Mar. 18, 1969

United States Patent Office 3,433,382
Patented Mar. 18, 1969

3,433,382
PRE-STRESSED SEGMENTED CONTAINERS OR PRESSURE VESSELS
F. George Boggio, Glen Rock, N.J., assignor to Barogenics, Inc., Mount Vernon, N.Y., a corporation of New York
Filed May 22, 1967, Ser. No. 640,311
U.S. Cl. 220—3       8 Claims
Int. Cl. F25j 5/00; B65d 7/44; B23p 11/02

ABSTRACT OF THE DISCLOSURE

An improved pressure vessel structure which comprises an outer support cylinder formed from a plurality of discrete ring sectors. The cylinder has a generally cylindrical bore extending longitudinally therethrough and a sleeve-like member positioned within the bore. Means are positioned between the support cylinder and the sleeve-like member for producing hoop tension in the support cylinder and hoop compression in the sleeve-like member prior to subjecting the vessel to fluid pressures.

---

The present invention is directed toward the art of pressure vessels and more particularly to vessels of the segmented type.

The invention is especially suited for constructing pressure vessels for use in ultra-high pressure work, and it will be described with particular reference thereto; however, it is appreciated the invention is capable of broader application and could be utilized in constructing vessels for a variety of uses.

United States Patent No. 3,279,993 to Brayman et al. describes a construction for vessels and containers especially suited for use in containing fluid pressure in the range of 400,000 p.s.i., and higher. The construction described by this patent comprises a main support cylinder formed from discrete ring sectors interconnected by tension-resistant couplings in such a manner that the cylinder is transmissive of hoop tension without Lamé effect. To permit the cylinder to contain fluid without leaks, a comparatively thin-walled inner tube is fitted within the cylinder. The tube does not provide any substantial resistance to expansion by the fluid under pressure and is as resiliently elastic as conditions will allow.

Since, as is described in the aforementioned patent, the Lamé effect in the thin-walled tube or cylinder is negligible and the main support cylinder is constructed so as to be without Lamé effect, the above-described pressure vessel construction overcomes all of the Lamé effect problems previously encountered in conventional pressure vessel construction and is extremely advantageous, especially in the construction of large size ultra-high pressure vessels.

Although the described construction has constituted a substantial advance in the pressure vessel art, problems have been encountered in the failure of the inner liner tube while it is under pressure. These failures have been caused by the radial outward expansion of the segmented support cylinder beyond the elastic limit of the inner liner tube. That is, the inner liner tube was, at times, not given sufficient support by the segmented support cylinder.

One of the primary reasons for this lack of support by the support cylinder is the difficulty of holding the construction tolerances of the large segmented vessel to the exact size and configuration required for the inner liner tube. Consequently, the inner liner tube, after being inserted in the support cylinder, would not fit closely with and receive support from the support cylinder at all points. As a result, when the vessel was placed under pressure, certain portions of the liner tube were permitted to expand radially beyond the elastic limit of the tube.

In accordance with the invention an improved pressure vessel construction for containing fluid under high pressure is provided comprising an elongated outer support cylinder formed from a plurality of discrete ring sectors joined by axially extending pin means. A generally cylindrical bore extends longitudinally through the cylinder and a sleeve-like member is positioned within the bore. Additionally, means are provided for producing hoop tension in the support cylinder and hoop compression in the sleeve-like member prior to placing high pressure fluid in the vessel.

Accordingly, a primary object of the present invention is the provision of a segmented pressure vessel construction which assures that the inner liner tube will at all times receive adequate support from the segmented support cylinder.

Another object of the present invention is the provision of a segmented pressure vessel construction which induces hoop compression in the liner tube.

A further object of the present invention is the provision of a construction for such vessels which overcomes problems resulting from variations in the tolerance in the outer support cylinder.

Yet another object of the present invention is the provision of a construction for segmented pressure vessels which permits on site construction of extremely large segmented pressure vessels while permitting the inner liner tube to be properly fitted within the segmented support cylinder.

These and other objects and advantages will become apparent from the following description when read in conjunction with the accompanying drawings wherein:

FIGURE 1 is a pictorial view of one modification of the invention showing a liner or tube about to be inserted in the segmented support cylinder.

FIGURE 2 is a pictorial view with a portion broken away and showing additional modifications of the invention.

FIGURES 3 and 4 are pictorial views with portions broken away showing additional modifications of the invention.

Referring now to the drawings wherein the showings are for the purpose of illustrating preferred embodiments of the invention only and not for the purpose of limiting same, FIGURE 1 shows the manner of forming a pressure vessel according to a first embodiment of the invention. This construction could be utilized for a variety of sizes of vessels, but is especially suited for those of relatively small size (i.e. within the range of conventional handling methods).

Broadly, as shown, the construction comprises a segmented support cylinder 10 formed from a plurality of discrete ring sectors and having a generally cylindrical bore 12 extending longitudinally therethrough. A fluid impervious elongated tubular or sleeve-like liner tube 14 is arranged to be received in the bore 12 and functions to sealingly retain fluid therein, while the support cylinder functions to withstand the radial pressure forces.

The segmented support cylinder 10 could be of a variety of specific constructions, such as shown in United States Patent 3,278,993 issued Oct. 18, 1966 to Brayman et al. As explained more fully in that patent, the basic consideration is that the cylinder be comprised of discrete ring sectors fitted together to form a complete cylinder with the sectors connected together in a manner which renders the cylinder transmissive of hoop tension without Lamé effect.

Lamé effect is a form of stress concentration which takes place in conventional cylinder constructions. By Lamé effect is meant the concentration of hoop tension stress produced in a cylinder wall at or near the inner diameter of the cylinder when the cylinder is subjected to a radially outward pressure on its inner wall. In thin-walled cylinders, the Lamé effect is generally considered to be negligible. However, in thick-walled cylinders (i.e. those having an inner diameter which is less than 10 times the cylinder wall thickness) the stress concentration from Lamé effect becomes substantial enough to be taken into account. According to the Lamé formula, the maximum stress occurs at the inside surface of the cylinder and is proportional to the pressure in the cylinder times a multiplying factor which decreases with an increase in the value of the ratio of the cylinders outer diameter to that of its inner diameter. The formula indicates that the stresses drop off rapidly as they proceed from the inner wall outward.

Although a variety of different support cylinder constructions could be utilized, as previously noted, the specific construction shown in the drawings is comprised of a plurality of axially superposed ring layers 18a–18m each formed from a plurality of discrete sectors 20. The sectors 20 in each ring are identical with the other seitors of the same ring and are provided with four openings or bores 22 which extend vertically through the sector and perpendicular to the upper and lower surfaces 23 and 25, respectively. These openings provide means permitting interconnection of the sectors in a manner which forms a complete cylinder which is transmissive of hoop tension without Lamé effect.

As shown, the sectors which make up each ring are rotated relative to those of the next adjacent ring by an angle equivalent to that subtended by about half the arcuate extent of one sector. This rotation produces between the sectors an interleaved or lapping relation wherein the two arcuate half portions of each ring sector are lapped fully or almost fully with an arcuate half portion of the adjacent sector and the next adjacent ring.

The lapping of the ring sectors permits them to be interconnected by axial shear pins 24 passing through holes 22. Thirty-two such shear pins 24 are shown. In the particular embodiment under consideration, shear pins 24 are of a length sufficient to pass through the entire length of the cylinder; however, as discussed in the aforementioned United States Patent No. 3,278,993, the pins 24 can be subdivided into shorter length pins each of which pass through a limited number of ring sectors.

In order to axially clamp the rings together to permit the support cylinder to resist axially directed loads, nuts, not shown, are threaded to the outer ends of the pins 24. Alternatively, the entire cylinder can be axially clamped by end plates connected by bolts in the manner shown in FIGURE 7 of the aforementioned patent.

The construction of the support cylinder provides a structure which is a closed cylinder transmissive of hoop tension. However, the hoop tension in the cylinder is free of any Lamé stress concentration at the cylinders inner wall because the inner wall is not continuous around the cylinder.

Because the construction provides an arrangement wherein there is no appreciable Lamé effect, the ratio of the outer diameter to the inner diameter is not determined by the criterion that the value of the ratio must be great enough to reduce to an acceptable level the Lamé stress concentration at the inner wall. This allows the wall thickness and outside diameter of the vessel to be substantially less than prior vessel constructions, and additionally, permits construction of vessels of a size heretofore impossible.

In order to permit the construction to sealingly contain fluid under extremely high pressure a relatively thin-walled liner tube 14 is arranged to be closely received in bore 12. As previously noted, for a thin-walled cylinder the Lamé effect is negligible. Consequently, the finished vessel is capable of withstanding extremely high pressures without any concentration of hoop tension stress produced by the Lamé effect.

Although not shown, the open ends of the cylinders are closed to provide a sealed pressure chamber. These closures can be of the type shown in United States Patents No. 3,063,594 to Gerard et al. or United States Patent No. 3,278,993, or any other type of closures capable of withstanding the pressure produced in the vessel.

The structure thus far described is substantially identical to that described in United States Patent No. 3,278,-993. Although this general structure has been a marked advance in the pressure vessel art for the reasons noted, certain problems have been encountered in failure of the inner liner tube when the vessel is under pressure. This failure has been the result of radial expansion of the segmented support cylinder beyond the elastic limits of the liner material. That is, the segmented support cylinder has failed, at times, to provide sufficient support for the liner tube. The lack of support has been caused by the inability to hold the tolerances of the support cylinder to the desired values and resultant slack in the cylinder.

The present invention overcomes this problem by expanding the bore of the support cylinder radially during assembly so as to produce any desired value of hoop tension in the cylinder. Consequently, when the cylinder is permitted to, or tends to, contract the inner liner tube is placed under hoop compression. This assures a tight and proper fit between the liner tube and the wall of the bore and assures that the liner tube sis properly supported by the support cylinder. Additionally, because the liner tube is preloaded in a direction opposite to that to which it is loaded by the fluid pressure it is to contain, the ultimate pressure which it can withstand is effectively increased by an amount proportional to the hoop compression induced in it.

The desired preloads can be induced in the cylinder and liner tube in a variety of ways. According to the embodiment shown in FIGURE 1, these preloads are produced by the relationship between the wall 26 of bore 12 and the exterior surface 27 of liner tube 14. As shown, the exterior surface 27 of liner tube 14 tapers throughout its length. That is, the outer surface of the liner tube is, in effect, a short portion of an extremely long cone. Although the center bore of the liner tube is shown as being a circular opening of uniform diameter it could of course have other configurations or be tapered in the same manner as the outer surface so as to produce a liner tube having a uniform wall thickness.

The wall 26 of center bore 12 is tapered in a manner identical to the outer surface of the liner tube. The exact degree of taper of the wall 26 and surface could, of course, be varied; however, a 1° taper is adequate for most cases. The respective diameters of the liner tube and the bore 12 are chosen so that as the liner tube is moved into the bore interference occurs between the liner tube and the bore. Consequently, the final positioning of the liner tube in the bore, such as by the use of a hydraulic press or jacks, causes any slack in the outer support cylinder to be taken up, and hoop tension is induced therein. Additionally, this final positioning and the tendency for the expanded bore to contract, or tend to contract, causes hoop compression to be induced in the liner tube.

By properly selecting the amount of interference between the liner tube and the support cylinder any desired preloading can be induced in the elements.

Preferably liner 14 is of a length greater than the vertical height of the support cylinder so as to allow selective variations in the final positioning. Subsequently, when the liner has been moved into the desired final position and the desired preloading accomplished, the protruding end or ends of the liner are machined off flush with the support cylinder. As previously noted, the method and structure of FIGURE 1 is especially advantageous for the construction of high pressure vessels of relatively small size. However, when the pressure vessel is of a size which is not within the range of conventional handling methods and on site construction is required, the method and structure is less practical. For such larger size vessels the structure and method of FIGURE 2 is preferred.

As shown in FIGURE 2, the structure according to this embodiment comprises an outer segmented support cylinder formed in the same manner as described with reference to the FIGURE 1 embodiment. Accordingly, like reference numerals have been utilized to denote the like parts.

According to this embodiment, in order to permit the bore 12 to be expanded radially to induce hoop tension stresses in the support cylinder, means, in the form of a cylindrical member 30, is positioned in the bore and arranged so as to be selectively, radially expansible and contractible.

As shown, member 30 comprises a cylindrical body having an outer diameter of a size permitting it to freely be received in bore 12. An axially extending slot 32 is formed through the wall of the member. The slot is tapered in width along its length and provides means for permitting selective expansion of the member. For this purpose a tapered wedge 36 is arranged to be received in the slot. As shown, the wedge is tapered in the same manner as the slot. Consequently, by driving the wedge downwardly into the slot 32 the member 30 can be expanded any desired amount to expand the bore 12 and induce the desired hoop tension in the support cylinder and take up any slack therein. After the member 30 has been expanded a liner tube 38, which has an outer diameter of a size slightly smaller than the inner diameter of member 30 in the expanded condition, is moved into the central bore of member 30. With the sleeve-like member or liner tube 38 in position, the wedge 36 is driven vertically to allow the support cylinder and member 30 to tend to contract and, thus, induce hoop compression in the liner 38. By properly selecting the taper of the slot and wedge 36 and the amount of movement of wedge 36 during the assembly operation, substantially any desired forces can be induced in the support cylinder and the liner tube.

The FIGURE 2 structure and method is especially suited for use in constructing extremely large pressure vessels of the type which must be constructed on site. As is apparent, the specific construction and arrangement of the expandable means can be varied. Two such modifications of this member are shown in FIGURES 3 and 4. In both these modifications the outer support cylinder is shown as being constructed in the same manner as the FIGURE 1 embodiment but with a portion broken away to show the arrangement of the expandable means.

As shown in FIGURE 3, the expandable means comprise a cylindrical member 39 positioned between the outer support cylinder and the liner tube or thin-walled inner sleeve 39'. Member 39 is provided with a single longitudinally extending slot 40 which is of uniform width throughout its length. The means to cause selective expansion of the member 39 include a pair of wedge members 42 and 44 having mating wedge surfaces 45 and 46 respectively. By positioning them in the slot 40 in the manner shown and driving them in opposite directions the member 39 is caused to be expanded and contracted. In all other respects the FIGURE 3 modification is identical in construction to that of FIGURE 2.

The modification of FIGURE 4 is generally similar to that of FIGURES 2 and 3. However, as shown, the expandable means comprises a cylindrical member 50 positioned between the support cylinder and a thin-walled inner sleeve 50'. The member 50 is sub-divided into three individual arcuate sections 51, 52 and 53. Each of the sections tapers outwardly from the upper end to the lower end and is of an arcuate extent of slightly less than 120°. Consequently, when the three members are positioned at equally spaced locations in bore 12 of support cylinder 10, slots or openings are produced between each of the sections. Three wedge members 54, 55 and 56 are provided for insertion in the thus formed slots. Consequently, by selectively driving the wedges vertically downward the bore 12 and support cylinder can be expanded radially any desired degree to produce the desired hoop tension in the support cylinder. The liner or sleeve 50' can then be inserted in the central opening of the expansible member and the wedges driven vertically upward to permit the member and the bore to tend to contract about the liner tube to induce the required hoop compression in the liner tube.

After the liner tube 50' has been positioned in the bore and properly preloaded, the ends of the wedge members are machined off flush with the top of the support cylinder in the manner described with reference to the FIGURE 2 embodiment.

Having thus described my invention, I claim:

1. An improved high pressure vessel construction for containing fluid under high pressure comprising: an elongated outer support cylinder formed from a plurality of discrete ring sectors joined by axially extending pin means; a generally cylindrical bore extending longitudinally through said cylinder; a sleeve-like member positioned within said bore; and, means comprising a selectively radially expansible cylindrical member positioned in said bore and surrounding said sleeve for producing hoop tension in said support cylinder prior to placing high pressure fluid in the vessel.

2. The device as defined in claim 1 wherein said radially expansible cylindrical member includes at least one tapered wedge member.

3. The device as defined in claim 1 wherein said radially expansible cylindrical member includes a plurality of tapered wedge members positioned at spaced circumferential locations.

4. An improved high pressure vessel construction for containing fluid under high pressure comprising: an elongated outer support cylinder formed from a plurality of discrete ring sectors joined by axially extending pin means; a generally cylindrical bore extending longitudinally through said cylinder; a sleeve-like member positioned within said bore; and, means for producing hoop tension in said support cylinder prior to placing high pressure fluid in the vessel, said means comprising an annular cylindrical body positioned within said bore and formed from a plurality of individual longitudinally extending arcuate sections.

5. The device as defined in claim 4 wherein wedge means are positioned intermediate and said arcuate sections.

6. An improved high pressure vessel construction for containing fluid under high pressure comprising: an elongated outer support cylinder formed from a plurality of interconnected discrete ring sectors; a generally cylindrical bore extending longitudinally through said cylinder; a sleeve-like member positioned within said bore; and, means comprising a selectively radially expansible cylindrical member positioned in said bore and surrounding said sleeve for producing hoop tension in said support cylinder prior to placing high pressure fluid in the vessel.

7. The device as defined in claim 6 wherein said radially expansible cylindrical member includes at least one tapered wedge member.

8. The device as defined in claim 6 wherein said radially expansible cylindrical member includes a plurality of tapered wedge members positioned at spaced circumferential locations.

References Cited

UNITED STATES PATENTS

| 339,885 | 4/1886 | Hill | 220—3 |
| 739,969 | 9/1903 | Young. | |
| 1,971,433 | 8/1934 | Tartrais | 138—140 XR |
| 2,360,391 | 10/1944 | Birchall | 220—3 |

RAPHAEL H. SCHWARTZ, *Primary Examiner.*

U.S. Cl. X. R.

29—446; 138—153, 159; 220—83